United States Patent
Rea et al.

(10) Patent No.: US 12,369,241 B2
(45) Date of Patent: Jul. 22, 2025

(54) SYSTEMS AND METHODS FOR CONTROLLING OUTDOOR LIGHTING TO REDUCE LIGHT POLLUTION

(71) Applicant: Rensselaer Polytechnic Institute, Troy, NY (US)

(72) Inventors: Mark S. Rea, Melrose, NY (US); Andrew Bierman, Albany, NY (US); John D. Bullough, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 17/928,419

(22) PCT Filed: Jun. 1, 2021

(86) PCT No.: PCT/US2021/035135
§ 371 (c)(1),
(2) Date: Nov. 29, 2022

(87) PCT Pub. No.: WO2021/243327
PCT Pub. Date: Dec. 2, 2021

(65) Prior Publication Data
US 2023/0209685 A1    Jun. 29, 2023

Related U.S. Application Data

(60) Provisional application No. 63/031,909, filed on May 29, 2020.

(51) Int. Cl.
*H05B 47/105* (2020.01)
*G06F 9/02* (2006.01)
(Continued)

(52) U.S. Cl.
CPC ............. *H05B 47/105* (2020.01); *G06F 9/02* (2013.01); *H05B 45/10* (2020.01); *H05B 45/20* (2020.01)

(58) Field of Classification Search
CPC ...... H05B 47/105; H05B 45/10; H05B 45/20; G06F 9/02
See application file for complete search history.

(56) References Cited

U.S. PATENT DOCUMENTS 7,387,405 B2    6/2008  Ducharme et al.
7,828,463 B1 *  11/2010 Willis .................. H05B 47/165
                                                              362/153.1
(Continued)

FOREIGN PATENT DOCUMENTS

EP    1234140 B1    8/2005
EP    1610593 B1    7/2015
(Continued)

OTHER PUBLICATIONS

International Search Report and the Written Opinion of the International Searching Authority, International Application No. PCT/US2021/035135, mailed Sep. 16, 2021.

*Primary Examiner* — Minh Tran
(74) *Attorney, Agent, or Firm* — Barclay Damon LLP; Anthony P. Gangemi

(57) ABSTRACT

A method of adjusting lighting to reduce sky glow. The method includes the steps of detecting, by a plurality of sensors, an amount of cloud coverage in a region of the troposphere; determining, by a sky glow reduction circuitry, whether the amount of clouds is greater than, less than, or equal to a predetermined cloud coverage threshold; and adjusting, by a light output controller circuitry, a light output of a plurality of light sources to reduce sky glow if the amount of clouds is less than or equal to the predetermined cloud coverage threshold. The adjusting step is at least partially based on a predetermined policy.

11 Claims, 4 Drawing Sheets

(51) Int. Cl.
   *H05B 45/10*     (2020.01)
   *H05B 45/20*     (2020.01)

(56)         References Cited

U.S. PATENT DOCUMENTS

| | | |
|---|---|---|
| 8,502,456 B2 | 8/2013 | Jarrell et al. |
| 8,716,942 B2 | 5/2014 | Jarrell et al. |
| 8,820,952 B2 | 9/2014 | Agrawal |
| 8,963,433 B2 | 2/2015 | Jarrell et al. |
| 9,084,333 B2 | 7/2015 | Chandran et al. |
| 9,113,514 B2 | 8/2015 | Wang et al. |
| 9,185,777 B2 | 11/2015 | Reed |
| 9,713,228 B2 | 7/2017 | Reed |
| 9,907,147 B2 | 2/2018 | Chen et al. |
| 9,974,148 B2 | 5/2018 | Eskonen et al. |
| 2003/0133292 A1 | 7/2003 | Mueller et al. |
| 2009/0284966 A1* | 11/2009 | Crookham ............. F21S 8/088 362/249.02 |
| 2012/0087115 A1 | 4/2012 | Maxik |
| 2013/0187552 A1 | 7/2013 | Frodsham et al. |
| 2014/0117852 A1 | 5/2014 | Zhai et al. |
| 2015/0008829 A1 | 1/2015 | Lurie et al. |
| 2015/0252979 A1 | 9/2015 | Bailey |
| 2015/0334807 A1* | 11/2015 | Gordin .................. H05B 47/11 315/158 |
| 2016/0050397 A1 | 2/2016 | Di Giamberardino et al. |
| 2016/0273726 A1 | 9/2016 | Adler |
| 2017/0324936 A1 | 11/2017 | Tran et al. |
| 2021/0076470 A1 | 3/2021 | Graff et al. |

FOREIGN PATENT DOCUMENTS

| | | |
|---|---|---|
| WO | 200043236 | 7/2000 |
| WO | 2013019135 A2 | 2/2013 |

* cited by examiner

SYSTEMS AND METHODS FOR CONTROLLING OUTDOOR LIGHTING TO REDUCE LIGHT POLLUTION

CROSS REFERENCE TO RELATED APPLICATION(S)

This application claims the benefit of U.S. Provisional Patent Application No. 63/031,909, filed May 29, 2020, which is incorporated by reference as if disclosed herein in its entirety.

FIELD

The present technology generally relates to area lighting fixtures and systems. More particularly, the present technology relates to control systems and methods for outdoor area lighting fixtures and systems to reduce light pollution (i.e. sky glow).

BACKGROUND

As indium gallium nitride ("InGaN") light emitting diode ("LED") technology makes ever greater penetration into the street lighting market, there is an ever-growing concern that InGaN LED's inherent short-visible-wavelength emission will increase light pollution. Short wavelengths are preferentially scattered in clear atmospheric conditions when observing the night sky is at its best. With an increase in InGaN LED technology, light pollution will increase, negatively affecting astronomical observation on clear nights.

Some communities have introduced ordinances aimed at eliminating street lighting or using long-visible-wavelength, narrowband spectra light sources, such as low-pressure sodium lamps, to illuminate streets. However, while such ordinances may reduce light pollution, there is much concern that they will also negatively affect the prevention of crime and traffic collisions, which are two of the main reasons for installing street lighting.

Therefore, a need exists for an improved area lighting control system and method that minimizes light pollution.

SUMMARY

Accordingly, one embodiment of the present technology is directed to a method of adjusting lighting to reduce sky glow. The method includes the steps of detecting, by a plurality of sensors, an amount of cloud coverage in a region of the troposphere; determining, by a sky glow reduction circuitry, whether the amount of clouds is greater than, less than, or equal to a predetermined cloud coverage threshold; and adjusting, by a light output controller circuitry, a light output of a plurality of light sources to reduce sky glow if the amount of clouds is less than or equal to the predetermined cloud coverage threshold. The adjusting step is at least partially based on a predetermined policy.

In some embodiments, the adjusting step further includes reducing an intensity of the light output by the plurality of light sources; and increasing a wavelength of the light output by the plurality of light sources.

In some embodiments, the predetermined policy includes a set of rules that govern lighting operations in an area illuminated by the light sources.

In some embodiments, the sky glow reduction circuitry and the light output controller circuitry are part of an artificial intelligence control unit configured to apply the predetermined policy.

In some embodiments, the predetermined cloud coverage threshold is in the range of about 40% to about 60%.

In some embodiments, the predetermined cloud coverage threshold is about 50%.

In some embodiments, the plurality of light sources are streetlights.

According to another embodiment of the present technology, a sky glow reduction system having one or more light sources, one or more sensors, and a control unit is provided. The one or more light sources are configured to output a variable intensity and variable wavelength illumination. The one or more sensors are configured to determine cloud coverage data in a region of the troposphere. The control unit is in communication with the one or more light sources and the one or more sensors. The control unit includes a sky glow reduction circuitry that is configured to receive the cloud coverage data from the one or more sensors and determine whether the cloud coverage in the region is greater than, less than, or equal to a predetermined cloud coverage threshold. The control unit includes a light output controller circuitry that is configured to adjust the illumination output from the one or more light sources to reduce sky glow if the sky glow reduction circuitry determines that the cloud coverage is less than or equal to the predetermined cloud coverage threshold.

In some embodiments, the control unit adjusts the illumination output from the one or more light sources by decreasing the intensity of the illumination output and increasing the wavelength of the illumination output.

In some embodiments, the control unit adjusts the illumination output from the one or more light sources based, at least in part, on a predetermined policy.

In some embodiments, the predetermined policy includes a set of rules for adjusting the illumination output based on the cloud coverage data and one or more local factors.

In some embodiments, the one or more local factors includes time or day, time of year, population density, traffic conditions, and special social occurrences.

In some embodiments, the predetermined cloud coverage threshold is in the range of about 40% to about 60%.

In some embodiments, the predetermined cloud coverage threshold is about 50%.

In some embodiments, the one or more light sources are streetlights.

Further objects, aspects, features, and embodiments of the present technology will be apparent from the drawing figures and below description.

DETAILED DESCRIPTION

A purpose of the present technology is to provide local communities with customizable systems and methods for limiting light pollution while maximizing the benefits of area and street lighting. In some embodiments, an active control system is configured to address light pollution based, at least in part, on community-determined criteria using objective sky data. The objective sky data is obtained by a sensor, and the control system uses algorithms to control light emissions from the area lighting. The sensor input and the algorithms that control light emissions are based on the physical characteristics of light scatter.

In some embodiments, the control system is configured to actively respond to clear-sky conditions such that the amount of light emitted by the area lighting source is reduced and its spectrum is shifted to longer wavelengths. On cloudy nights, the light levels (e.g., the intensity and the wavelength of the light emitted by the area lighting source) are configured to return to the prescribed amounts and spectrum. In some embodiments, the changes to the lighting system are governed by the local community needs. A light sensor integrated into an area lighting fixture is configured to measure the local sky conditions. In some embodiments, a plurality of fixture-mounted sensors are networked together to provide real-time data to an artificial intelligence ("AI") control unit that is configured to apply a community-determined set of policies (e.g., rules, ordinances, etc.) that govern the area lighting operation. In some embodiments, the rules that determine when and how the area lighting will be adjusted for a specific community are based on the objectively measured sky conditions in conjunction with other relevant inputs for controlling the area lighting, such as time of day, time of year, population density in the community, real-time traffic data, special events in the community, etc.

Figure 1:
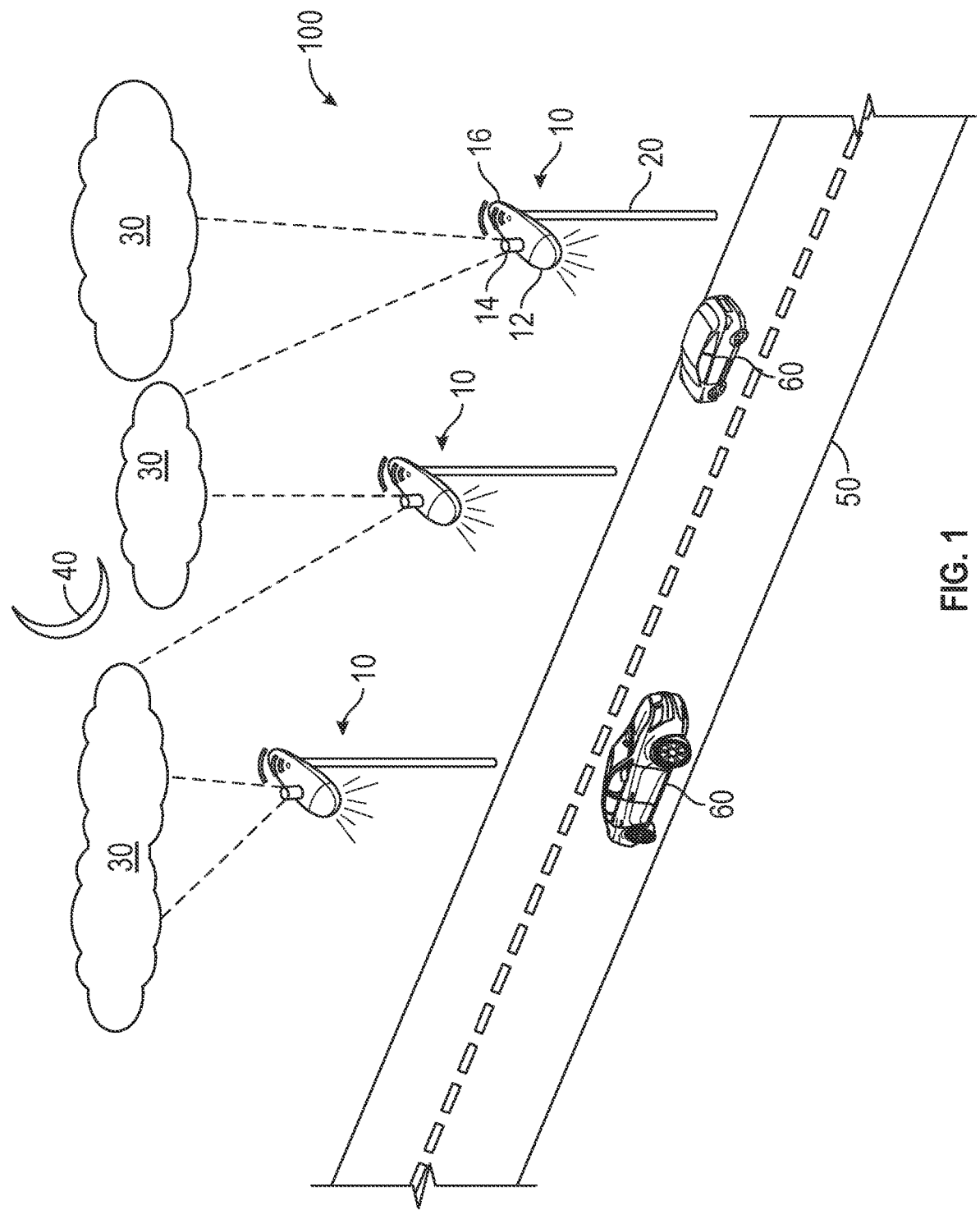
FIG. 1 is a perspective view of an area lighting control system according to an exemplary embodiment of the present technology.

FIG. 1 shows a perspective view of an area lighting control system 100 according to an embodiment of the present technology. The area lighting control system 100 includes a plurality of area lighting fixtures 10 that are configured to illuminate an area, such a street, sidewalk, park, tunnel, parking lot, etc. In the embodiment shown in FIG. 1, the area lighting fixtures 10 are streetlights that are each mounted to poles 20 for illuminating a street 50 for vehicles 60. Each of the area lighting fixtures 10 includes a light source 12, a sensor 14, and a communication unit 16. The sensor 14 is configured to detect and measure objective local sky data. Preferably, the sensor 14 is configured to detect the clouds 30 in a region of the troposphere that may be preventing the moon 40 from illuminating the street 50. In some embodiments, the sensor 14 is configured to detect the cloud coverage in a conical region of the troposphere above the area lighting fixture 10. In some embodiments, the sensor 14 is configured to detect only the clouds 30 positioned directly above the area lighting fixture 10. In some embodiments, the sensor 14 includes one or more photodiodes such that the sensor 14 is configured to detect the cloud coverage by measuring the illumination in the night sky (i.e. moonlight) above the area lighting fixture 10. In some embodiments, the sensor 14 includes one or more line-of-sight detectors (e.g., lidar, radar, etc.) such that the sensor 14 is configured to directly measure the cloud coverage above the area lighting fixture 10. The communication unit 16 is configured to communicate the sky data to a control unit 71 via a network 70, as discussed in detail below.

Figure 2:
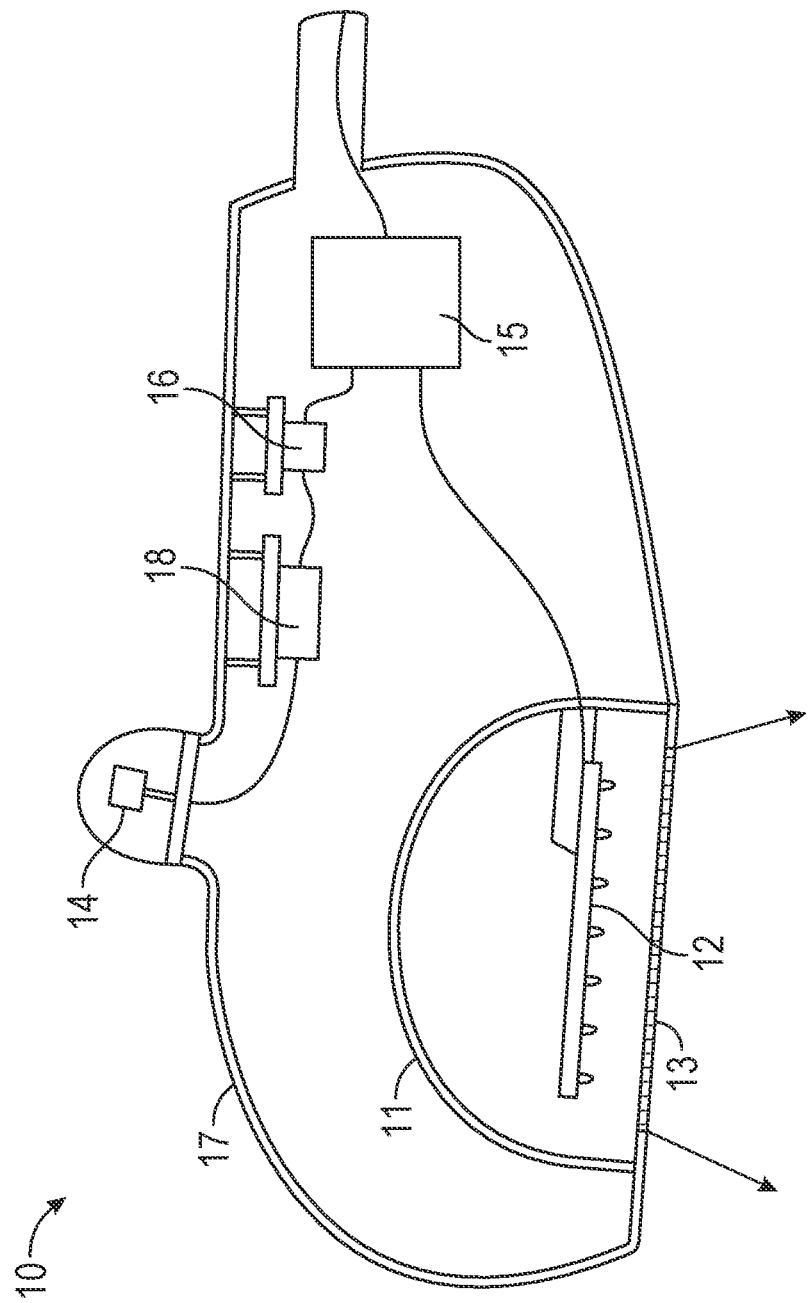
FIG. 2 is a side cross-sectional view of an area lighting fixture according to exemplary embodiment of the present technology.

FIG. 2 shows a cross-sectional view of an exemplary area lighting fixture 10 according to an embodiment of the present technology. The area lighting fixture 10 includes a frame 17 housing the light source 12, a reflector 11 to direct the illumination downwards toward a ground surface, and a lens 13 to direct the illumination in a desired pattern to the area being illuminated. The light source 12 includes one or more lamps, such as LEDs, gas lamps, fluorescent lamps, incandescent lamps, etc., that provide adjustable illumination under the control of the control unit 71. The sensor 14 is secured atop the frame 17 and is in electrical communication with a microprocessor 18 and the communication unit 16, which are positioned within the frame 17. The microprocessor 18 is configured to receive control instructions from the control unit 71 for adjusting the illumination emitted from the light source 12. A power source 15 (e.g., a transformer, rectifier, converter, etc.) is positioned within the frame 17 and is configured to supply electrical power to the light source 12, sensor 14, communication unit 16, and microprocessor 18.

Figure 3:
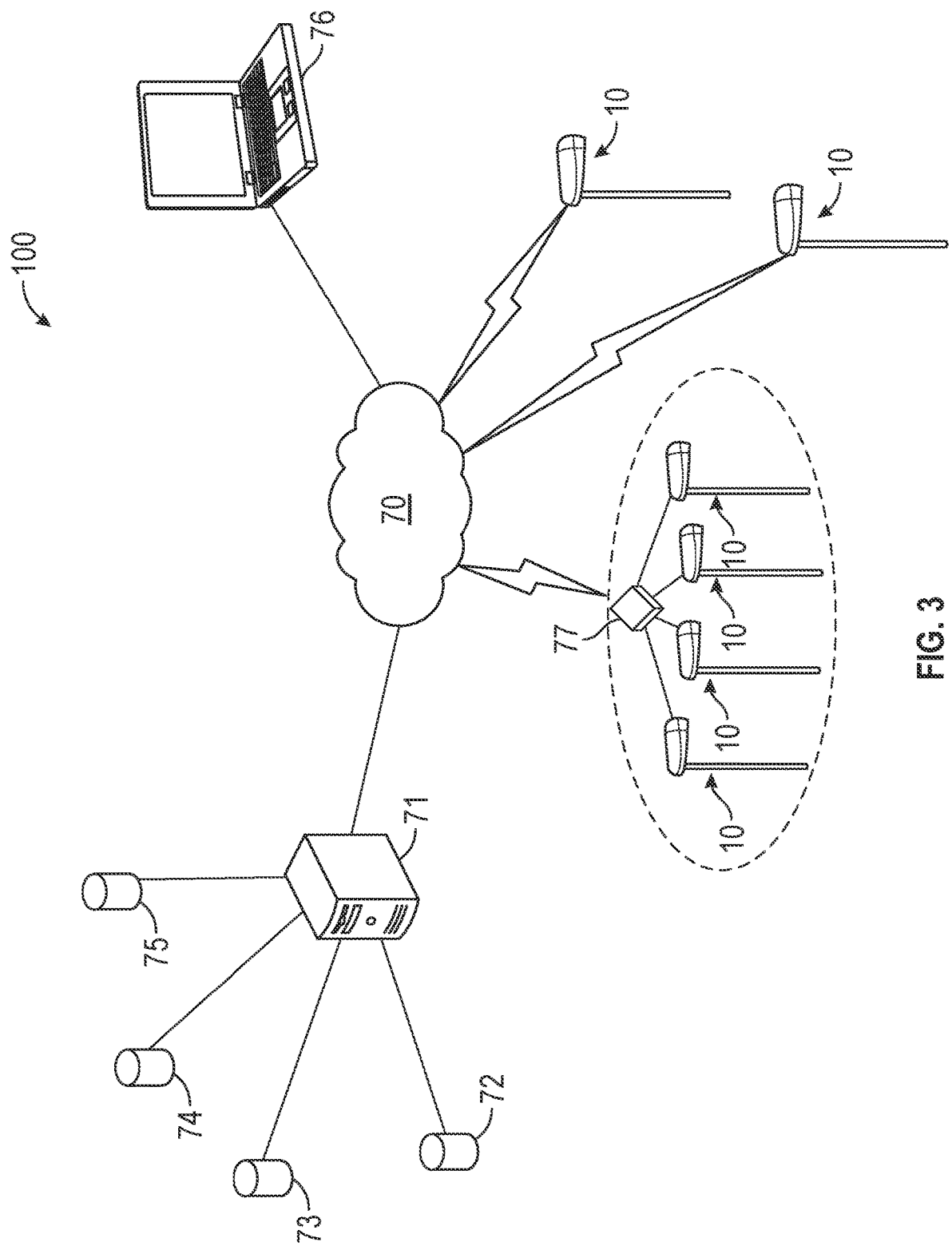
FIG. 3 is a schematic view of an area lighting control system architecture according to an exemplary embodiment of the present technology.

FIG. 3 shows an exemplary area lighting control system 100 architecture according to an embodiment of the present technology. One or more area lighting fixtures 10 are installed and connected to the control unit 71 via the network 70. In some embodiments, a plurality of area lighting fixtures 10 are connected to a gateway 77 that is connected to the control unit 71 via the network 70. In some embodiments, the control unit 71 is connected, via the network 70, to an area lighting system administrator 76 who monitors and, when needed, updates, repairs, or changes the algorithms used in the area lighting control system 100. The network 70 utilizes wireless and/or wired connections. The present technology contemplates use of any suitable network 70 or one or more networks 70 to communicate data, such as a wide area network, a local area network, a telephony network (e.g., 3G, 4G, 5G, code division multiple access, global system for mobile network, plain old telephone service network, etc.), a peer-to-peer network, a wireless fidelity network, a Bluetooth network, the Internet, etc.

The control unit 71 is preferably a server implemented as a central or distributed computing service (e.g., cloud service) that connects to several databases or information systems that provides/stores different types of information that are used in conjunction with the sky data obtained by the sensors 14 in determining when and how to adjust the illumination provided by the light sources 12. For example, regulations database 72 provides information about applicable standards and regulations to a specific area (e.g., rules/ordinances regarding light pollution in the areas being illuminated by the area lighting fixtures 10); city information database 73 provides information about the specific cities in which the area lighting fixtures 10 are located (e.g., population density, schedule of special social events/occurrences, etc.); traffic database 74 provides real-time vehicular traffic information for the areas illuminated by the area lighting fixtures 10; and almanac database 75 provides temporal and climate information for the areas illuminated by the area lighting fixtures 10 (e.g., time of day, time of year, moon phases, sunrise and sunset times, weather forecasts, etc.).

Figure 4:
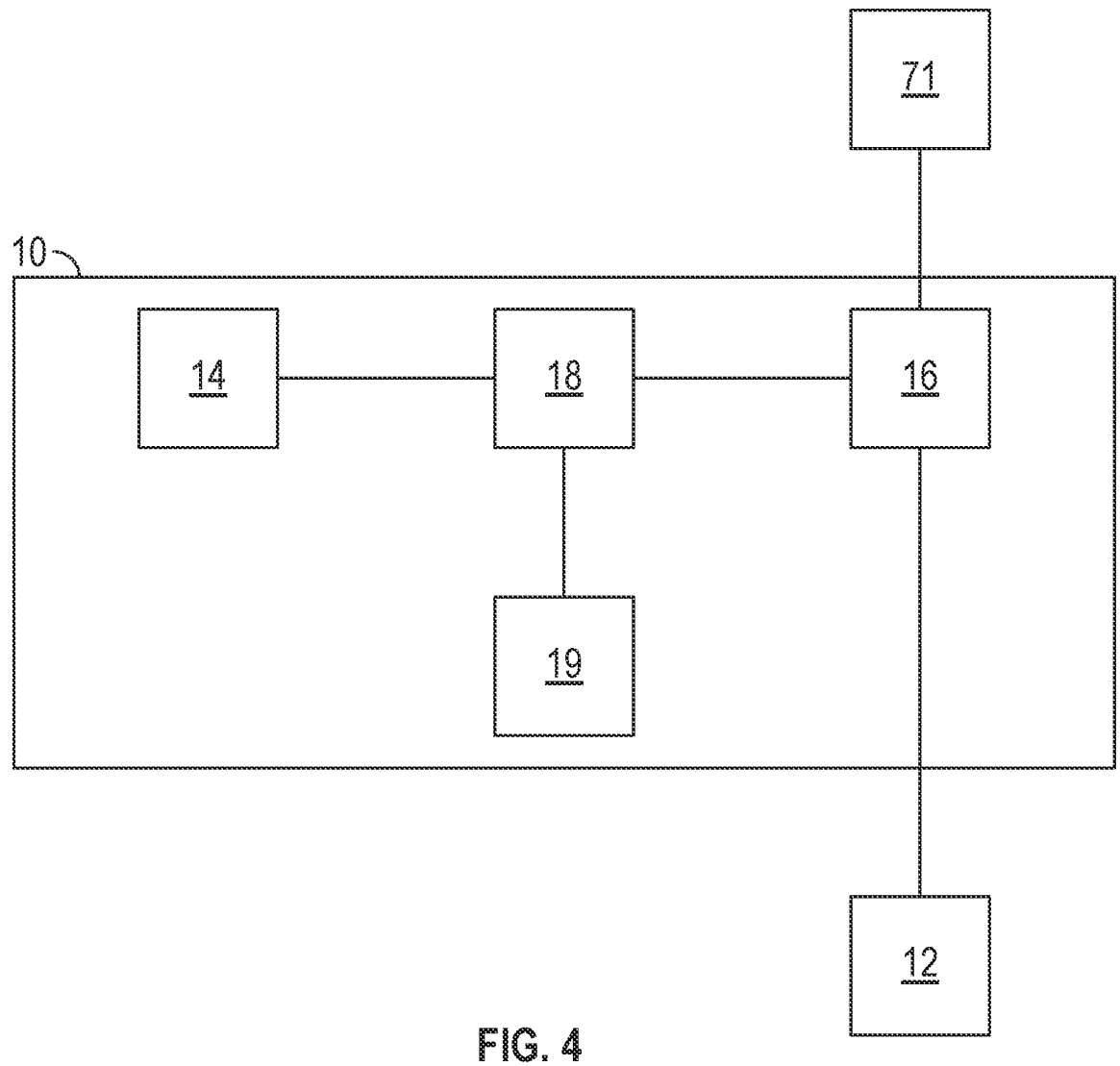
FIG. 4 is a block diagram of an area lighting control system according to an exemplary embodiment of the present technology.

FIG. 4 shows a block diagram for an exemplary area lighting fixture 10 according to the present technology. The area lighting fixture 10 includes the microprocessor 18, the sensor 14 operably connected to the microprocessor 18, a memory 19 operably connected to the microprocessor 18, and the communication unit 16 operably connected to the microprocessor 18 for communication between the area lighting fixture 10 and the control unit 71. The microprocessor 18 is configured to create instructions, execute instructions, and/or process data in accordance with instructions. The memory 19 is any type of memory capable of storing data, programs, and/or instructions, such as random access memory, read-only memory, flash memory, magnetic computer storage devices, optical discs, etc. The communication unit 16 is any type of device that can communicate with the control unit 71 via the network 70, such as a ZigBee chip, radio chip with an application layer, application-specific integrated circuit, etc.

In some embodiments, the control unit 71 includes a sky glow reduction circuitry that is configured to receive the cloud coverage data from the sensor 14. The sky glow reduction circuitry runs an algorithm that determines whether the cloud coverage in the area being illuminated by the area lighting fixture 10 is greater than, less than, or equal to a predetermined cloud coverage threshold. In some embodiments, the predetermined cloud coverage is in the range of about 30% to about 70% of a conical region of the troposphere above the sensor 14. In some embodiments, the predetermined cloud coverage is in the range of about 40% to about 60% of a conical region of the troposphere above the sensor 14. In some embodiments, the predetermined cloud coverage is about 50% of a conical region of the troposphere above the sensor 14. In some embodiments, the predetermined cloud coverage threshold is based on information obtained from the regulations database 72.

In some embodiments, the control unit 71 includes a light output controller circuitry that is configured to generate illumination adjustment signals to adjust the illumination output from the light source 12 to reduce sky glow if the sky glow reduction circuitry algorithm determines that the cloud coverage is less than or equal to the predetermined cloud coverage threshold. In some embodiments, the light output controller circuitry runs an algorithm that generates the illumination adjustment signals based on information obtained by the databases (e.g., regulations database 72, city information database 73, traffic database 74, almanac database 75) in conjunction with the cloud coverage data. In some embodiments, the light output controller algorithm generates the illumination adjustment signals based on a predetermined policy, such a set of rules for reducing sky glow obtained from the regulations database 72. In some embodiments, the set of rules for reducing sky glow are based on the cloud coverage data and one or more local factors obtained from the city information database 73, the traffic database 74, and/or the almanac database 75. In some embodiments, the one or more local factors include time of day, time of year, population density in the area, traffic conditions in the area, special social events/occurrences in the area, etc.

The control unit 71 communicates the illumination adjustment signal to the microprocessor 18 via the network 70 and communication unit 16. Based on the illumination adjustment signal, the microprocessor 18 adjusts the illumination output by the light source 12 to reduce sky glow (i.e. reduce light pollution) by decreasing the intensity of the illumination output and increasing the wavelength of the illumination output. The amount that the illumination intensity is decreased and the amount that the illumination wavelength are increased are determined by the predetermined policy discussed above.

In some embodiments, the illumination adjustment signal is communicated to a gateway 77, which then communicates the illumination adjustment signal to a plurality of area lighting fixtures 10 to reduce sky glow for a larger area. In some embodiments, each area lighting fixture 10 requires a different illumination adjustment signal, and the different illumination adjustment signals are communicated to the gateway 77, which then disseminates the illumination adjustment signals to the respective area lighting fixtures 10. In some embodiments, the microprocessor 18 includes the sky glow reduction circuitry and the light output controller circuitry such that the area lighting fixture 10 is configured to self-adjust the illumination output by the light source 12 based on the cloud coverage data obtained by the sensor 14. In some embodiments, the microprocessor 18 receives information from the databases 72, 73, 74, 75 via the network 70 and communication unit 16, and the microprocessor 18 runs the algorithms discussed above such that the area lighting fixture 10 can more accurately reduce sky glow.

Although the technology has been described and illustrated with respect to exemplary embodiments thereof, it should be understood by those skilled in the art that the foregoing and various other changes, omissions, and additions may be made therein and thereto, without parting from the spirit and scope of the present technology.

What is claimed is:

1. A method of adjusting lighting to reduce sky glow, the method comprising the steps of:
    detecting, by a plurality of sensors, an amount of cloud coverage in a region of the troposphere;
    determining, by a sky glow reduction circuitry, whether the amount of clouds is greater than, less than, or equal to a predetermined cloud coverage threshold; and
    adjusting, by a light output controller circuitry, a visible light output of each of a plurality of light sources configured to illuminate an area below the light source to reduce sky glow if the amount of clouds is less than or equal to the predetermined cloud coverage threshold, the adjusting of the light output of each of the plurality of light sources comprises:
        reducing an intensity of the light output of the light source; and
        increasing a wavelength of the light output of the light source;
    wherein the adjusting step is at least partially based on a predetermined policy, wherein the plurality of light sources are streetlights.

2. The method of adjusting lighting to reduce sky glow of claim 1, wherein the predetermined policy comprises a set of rules that govern lighting operations in an area illuminated by the light sources.

3. The method of adjusting lighting to reduce sky glow of claim 1, wherein the sky glow reduction circuitry and the light output controller circuitry are part of an artificial intelligence control unit configured to apply the predetermined policy.

4. The method of adjusting lighting to reduce sky glow of claim 1, wherein the predetermined cloud coverage threshold is in the range of about 40% to about 60%.

5. The method of adjusting lighting to reduce sky glow of claim 1, wherein the predetermined cloud coverage threshold is about 50%.

6. A sky glow reduction system, comprising:
    a plurality of light sources configured to illuminate an area below the plurality of light sources and to output a variable intensity and variable wavelength illumination of visible light; the plurality of light sources are streetlights;
    at least one sensor configured to determine cloud coverage data in a region of the troposphere; and
    a control unit in communication with the plurality of light sources and the at least one sensor, the control unit comprising:
        a sky glow reduction circuitry configured to receive the cloud coverage data from the at least one sensor and determine whether the cloud coverage in the region is greater than, less than, or equal to a predetermined cloud coverage threshold; and a light output controller circuitry configured to adjust the illumination output from each of the plurality of light sources by decreasing the intensity of the illumination output and increasing the wavelength of the illumination output of visible light of each of the plurality of light sources to reduce sky glow if the sky glow reduction circuitry determines that the cloud coverage is less than or equal to the predetermined cloud coverage threshold.

7. The sky glow reduction system of claim 6, wherein the control unit adjusts the illumination output from the plurality of light sources based, at least in part, on a predetermined policy.

8. The sky glow reduction system of claim 7, wherein the predetermined policy comprises a set of rules for adjusting the illumination output based on the cloud coverage data and at least one local factor.

9. The sky glow reduction system of claim 8, wherein the at least one local factor comprises time of day, time of year, population density, traffic conditions, and special social occurrences.

10. The sky glow reduction system of claim 6, wherein the predetermined cloud coverage threshold is in the range of about 40% to about 60%.

11. The sky glow reduction system of claim 6, wherein the predetermined cloud coverage threshold is about 50%.

* * * * *